United States Patent [19]

Iuchi

[11] Patent Number: 4,876,915
[45] Date of Patent: Oct. 31, 1989

[54] STEERING WHEEL

[75] Inventor: Yasuaki Iuchi, Aichi, Japan

[73] Assignee: Toyoda Gosei Co., Ltd., Nishikasugai, Japan

[21] Appl. No.: 331,045

[22] Filed: Mar. 28, 1989

Related U.S. Application Data

[63] Continuation of Ser. No. 60,614, Jun. 11, 1987, abandoned.

[30] Foreign Application Priority Data

Aug. 28, 1986 [JP] Japan .................................. 61-204949
Aug. 29, 1986 [JP] Japan .......................... 61-122610[U]

[51] Int. Cl.⁴ ........................... B62D 1/04; B28B 9/00
[52] U.S. Cl. ..................................... 74/552; 29/159 B; 264/250; 264/271.1; 264/275; 264/279.1
[58] Field of Search ................. 74/552, 558; 29/159 B; 280/731, 750, 777, 778; 264/250, 255, 271.1, 275, 279.1

[56] References Cited

U.S. PATENT DOCUMENTS

| 3,802,291 | 4/1974 | Young et al. | 74/552 |
| 4,118,455 | 10/1978 | Byrn | 74/552 |
| 4,201,830 | 5/1980 | Wollen | 74/552 |
| 4,280,372 | 7/1981 | Van Wicklin | 74/552 |
| 4,327,601 | 5/1982 | Vivian | 74/552 |
| 4,468,978 | 9/1984 | Takahara et al. | 74/552 |
| 4,581,954 | 4/1986 | Uchida | 74/552 |
| 4,811,472 | 3/1989 | Kobayashi | 264/275 X |

FOREIGN PATENT DOCUMENTS

| 0178970 | 11/1982 | Japan | 74/552 |
| 0032843 | 2/1985 | Japan | 74/552 |
| 1571902 | 7/1980 | United Kingdom | 74/552 |
| 2192577 | 1/1988 | United Kingdom | 264/250 |

Primary Examiner—Vinh Luong
Attorney, Agent, or Firm—Cushman, Darby & Cushman

[57] ABSTRACT

A steering wheel for a motor vehicle having a covering material of synthetic resin injection-molded around a core metal and resinous inserts, characterized in that positioning protrusions in contact with or located close to the surfaces of injection molding dies are provided on each of the resinous inserts.

5 Claims, 5 Drawing Sheets

STEERING WHEEL

This is a continuation of application Ser. No. 07/060,614, filed June 11, 1987 now abandoned, which was abandoned upon the filing hereof.

BACKGROUND OF THE INVENTION

1. Field of the Invention

The present invention relates to a steering wheel for a motor vehicle, and more particularly to a steering wheel built of a core metal and resinous inserts covered with injection-molded synthetic resin material.

2. Prior Art

Conventional steering wheels are manufactured by molding synthetic resin such as urethane, polypropylene and the like into a covering material around each core metal by injection molding. However, because a considerable amount of synthetic resin is used to provide such a covering material, a huge material cost is incurred.

In consequence, attempts are being made to build a steering wheel by filling the inside of the thick portion of the covering material with resinous inserts. More specifically, low-priced resinous inserts together with the core metal are set and then the covering material is formed around the core metal and the resinous inserts by injection molding.

The steering wheel thus manufactured allows for a substantial saving of the synthetic resin consumed in the covering material and accordingly ensures reduction in cost.

BACKGROUND OF THE INVENTION

The steering wheel having the aforesaid resinous inserts still poses a problem in that the thickness of the covering material may become small partially because it is difficult to properly position the resinous inserts.

To be concrete, dimensional errors and distortions inherent in the resinous inserts make it difficult to set the resinous inserts together in proper positions in an injection mold. Particularly, if the space between the surface of the resinous insert and the die surface is too small partially, the thickness of the covering material in that portion also becomes too small and rough to the touch. In an extreme case, some of the resinous inserts may be exposed and thereby treated as defectives.

SUMMARY OF THE INVENTION

In order to solve the aforesaid problems, the steering wheel according to the present invention is built of a core metal and resinous inserts covered with injection-molded synthetic resin material and each insert is provided with positioning protrusions in contact with or located close to the surface of injection molds.

When the core metal and the resinous inserts are subjected to mold registering, the resinous inserts are properly positioned as the protrusions of each resinous insert make contact with or are located close to the die surface.

When the covering material is injected, it is molded into what has at least the same thickness as that of the positioning protrusion since there has been secured the space equivalent to the height of each positioning protrusion between the surface of the resinous insert and that of the die.

Accordingly, the resinous inserts are properly located in the covering material of the steering wheel, whereas the covering material is allowed to have a predetermined thickness.

When the positioning protrusion is partly exposed above a level of the surface of the resinous insert, such a position is covered with a pad, or the like. Alternatively, it may be covered with a leather or coated with a paint. Thus, the steering wheel does not have a ornamental drawbacks. In the case, the resinous inserts are properly located and the covering material has a predetermined thickness.

BRIEF DESCRIPTION OF THE DRAWING

FIG. 1 is a sectional view of the principal part when an injection mold is opened;

FIG. 2 is a sectional view of the principal part when the injection mold is closed;

FIG. 3 is a top view of the principal part of the moving die;

FIG. 4 is a top view of the moving die;

FIG. 5 is a sectional view taken on line V—V FIG. 4 showing the fixed and moving dies; and FIG. 6 is a top view of a preformed steering wheel.

DETAILED DESCRIPTION OF THE PREFERRED EMBODIMENT

Figure 1:
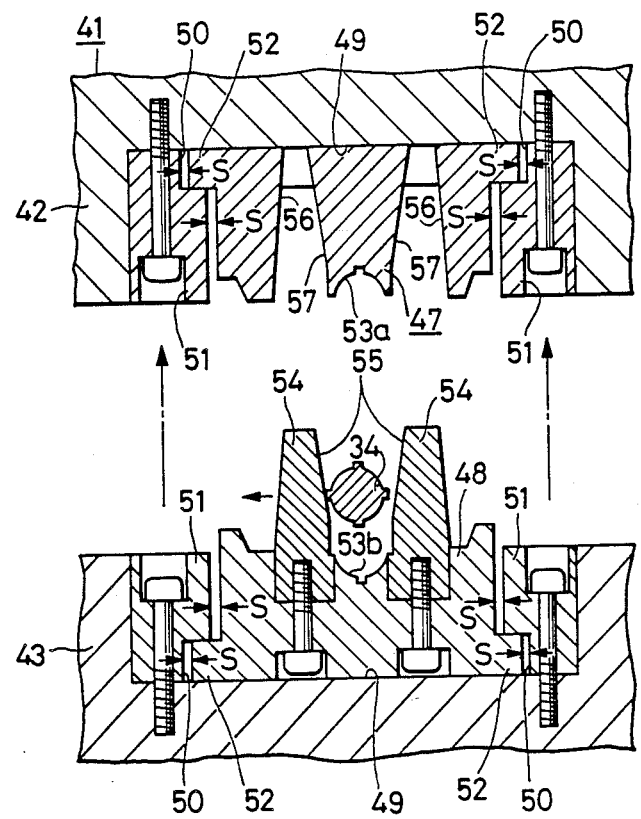
FIGS. 1 through 6 shows an embodiment of the present invention.

Referring to the accompanying drawings, embodiments of the present invention will be described.

FIGS. 1 through 6 show an injection mold for forming a steering wheel embodying the present invention.

The injection mold is equipped with an upper stationary part 42 and a lower moving part 43. A set pin 40 is provided in the center of the lower moving part 43 and used to set a steering wheel core metal 35 as an insert in a proper position by inserting a boss 31 therein.

Figure 4:
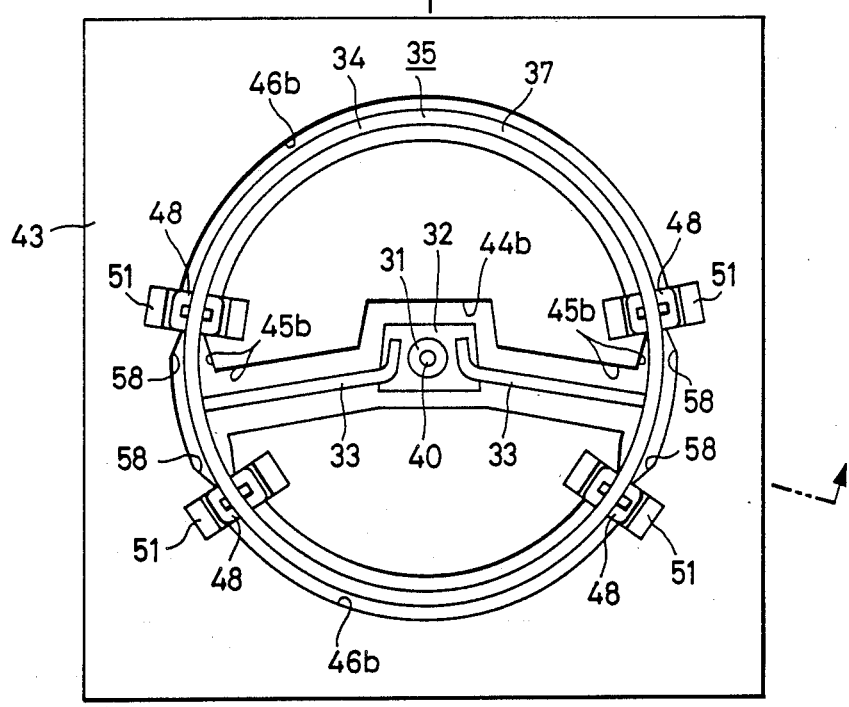
Figure 6:
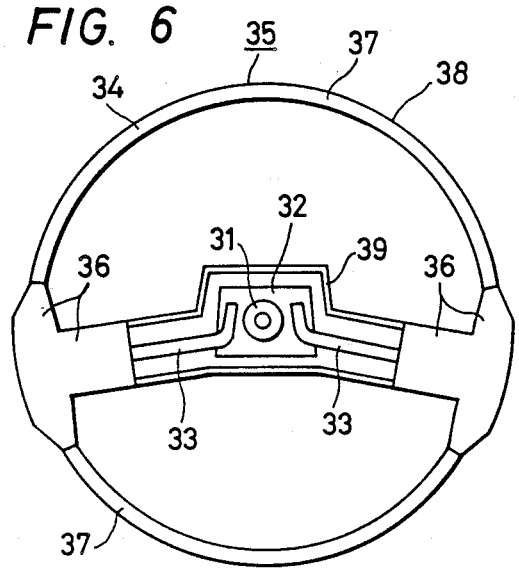
Figure 5:
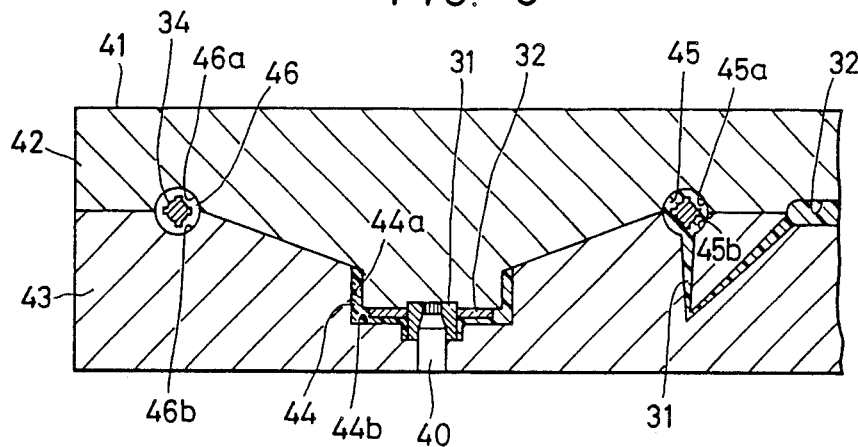

As shown in FIGS. 4, 5, inner die surfaces 44a, 44b constituting an inner lower cover for forming an inner lower cover cavity 44 are provided in the center of the fixed part 42 and the moving part 43 when they are combined. Moreover, there are provided die surfaces 45a, 45b for resinous inserts for forming a resinous insert cavity 45 when the dies are combined in the position where the front end of the aforesaid spoke core metal 33 out of the fixed part 42 and moving part 43 and both sides of a ring core metal 34 are arranged.

There are also formed diameter abridging portions 58 at both ends of the ring of the die surfaces 45a, 45b for the insertion of the aforesaid resinous inserts, so that the ends of the resinous inserts 36 can smoothly be coupled to the exposed portions 7.

In the portion where the remaining part of the ring core metal 34 out of the fixed and moving parts 42, 43 is contained, circular recesses 46a, 46b for forming a containment chamber 46 are formed in two places in front and rear.

On the four border lines among the die surfaces 45a, 45b for resin insertion in the fixed and moving dies 42, 43 are arranged fixed and moving insert dies 47, 48 for forming the exposed portions 37 of the aforesaid ring core metal 34.

Figure 2:
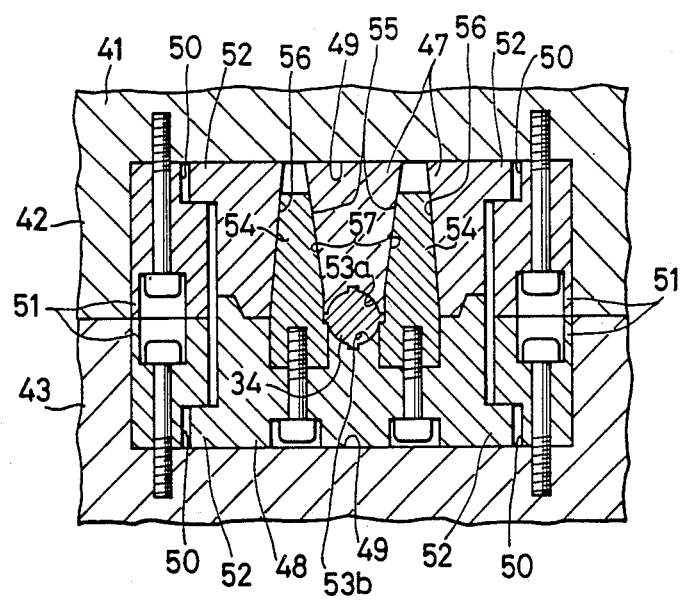
Figure 3:
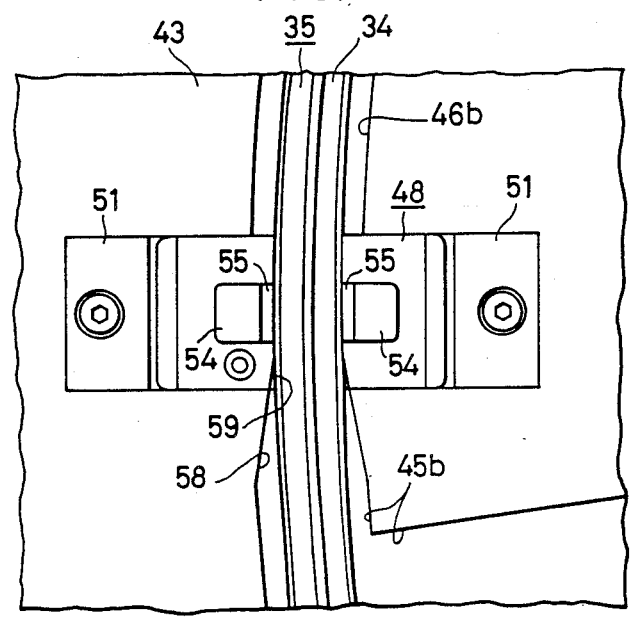

In other words, as shown in FIGS. 1-3, an insert die recess 49 is formed on the border line of the fixed and moving parts 42, 43 and support members 51 as support means having fitting recesses 50 are respectively fixed at the both ends of the insert die recess 49. On the other hand, protrusions 52 are formed on both sides of the bottom of the fixed and moving insert die 47, 48, each protrusion being slidably but unretractably fitted to the recess 50. Moreover, a space S equivalent to the upper limit of the tolerance of the steering wheel core metal 35 is provided between the sides of the fixed and moving insert dies 47, 48 and between the end face of the protrusion 52 and the inner end face of the fitted recess 50.

As set forth above, the fixed and moving insert dies 47, 48 are so supported that they can be moved by the support member 51 up to the maximum extent of ±S in the direction across the axis of the ring core metal.

Grooves 53a, 53b for sandwiching and holding the outer peripheries of the portions to be the exposed ones of the closed ring core metal 34 are provided in the center of the undersurface of the fixed die 47 and the surface of the moving die 48 and, since both the grooves 53a, 53b are formed identically with the outer periphery of the ring core metal 34 in terms of dimensions, they are capable of sufficiently choking the outer periphery of the ring core metal 34.

Two guide members 54 are vertically installed on both sides of the holding groove 53b of the moving die 48 with screws and the inner surface of each guide member 54 is tapered 55 so as to lead the ring core metal 34 to the holding groove 53b. Each tapered surface 55 is coupled to tee holding groove 53b with the same space in width as that of the holding groove at its lower end the space being increased upward.

On the other hand, a hole 26 for receiving the aforesaid guide member 54 is provided on each side of the holding groove 53a of the fixed die 47 and tapered faces 55 corresponding to the tapered faces 57 are formed on the inner walls of both insert holes 56.

Moreover, the moving insert die 48 is provided with a tapered pin (not shown), whereas the fixed die is equipped with a tapered hole (not shown) for receiving the aforesaid pin, whereby the pin thus fitted into the hole facilitates the movement of the fixed die 47 to the corresponding to that of the moving insert pin 48.

In the portion adjacent to the aforesaid diameter abridging portion 58 of the moving die 48, there is installed a recessed conical face 59 continuous up to the aforesaid diameter abridging portion 58, so that the border line of the exposed portion 37 is smoothly formed at the front end of the conical face 59.

Furthermore, runner gates 61 and spools 6 for injecting resin into cavities 44, 45 are installed in the fixed positions of the fixed and moving 42, 43.

In the injection mold thus arranged, the steering wheel core metal 35 as an insert is straightly brought down from the upper side to the lowered moving part 43 to set, by fitting the boss 1 into the set pin 40, the steering wheel core metal 35 in the proper position of the die face 44b for the inner lower cover, the die face 45b for resin insertion and the container recess 46b. At this time, the end intended for the exposed portion 37 of the ring core metal 34 is, as shown in FIG. 1, lowered up to the holding groove 53b.

Assuming there is no dimensional error in the ring core metal 34, the ring metal core 34 is fitted into the holding groove 53b without abutting against the guide member 54.

However, because the variation of the dimension and shape of the ring core metal 34 in excess of tolerance generally exists, the ring core metal 34 is caused to abut against some of the tapered face 25 of the guide member 54 and the guide member 54 receives the force directed as shown by an arrow of FIG. 1, for instance. That force causes the whole moving die 48 to move in the direction perpendicular to the axis of the ring core metal 34 while allowing the protrusions 52 to slide on the fitting recesses 20, whereby the ring core metal 34 is led to the holding groove 53b.

Consequently, the holding groove 53b is formed in the same dimensional shape as that of the ring core metal 34 and, despite the aforementioned fact, it is ensured that the ring core metal 34 is fitted into the holding groove 53b.

When the moving die 43 is lifted to close the injection mold, the aforesaid taper pin (not shown) uprightly installed in the moving die 48 is led to the tapered hole bored in the fixed die 47 while it abuts against the inner wall thereof, whereby the tapered hole is subjected to the transversely directed force caused by the tapered pin. That force also causes the whole fixed die 47 to move in the direction perpendicular to the axis of the ring core metal 34 while allowing the protrusions 52 to slide on the fitting recesses 50.

Accordingly, as shown in FIG. 2, the guide member 54 is fitted into the fitting hole 56 and the ring core metal 34 is surely fitted into the holding groove 53a.

When the outer periphery of the ring core metal 34 is held between both the holding grooves 53a, 53b having the same dimensional shape as that of the ring core metal 34, the outer periphery thereof is sufficiently enclosed thereby because no gap is allowed there between.

When resin is injected from the spool 62 and the runner gate 61, only cavities 44, 45 are filled with the resin and the resin used to fill the resin insert cavity 45 is surely blocked by the fixed and moving dies 47, 48, whereby the resin is prevented from leaking out to a portion for use as the exposed one 37 of the ring core metal 34.

The aforesaid mold is not limited to what has been described above but may be modified in a desired manner.

In the description of the mold, (1) the tapered face includes a slightly curved face;

(2) the means for supporting the die may be changed. In short, use can be made of anything capable of supporting the die in such a manner as to make it movable the direction perpendicular to the axis of the insert; and (3) the mold may be used for manufacturing not only steering wheels but also various injection-molded pieces.

Figure 7:
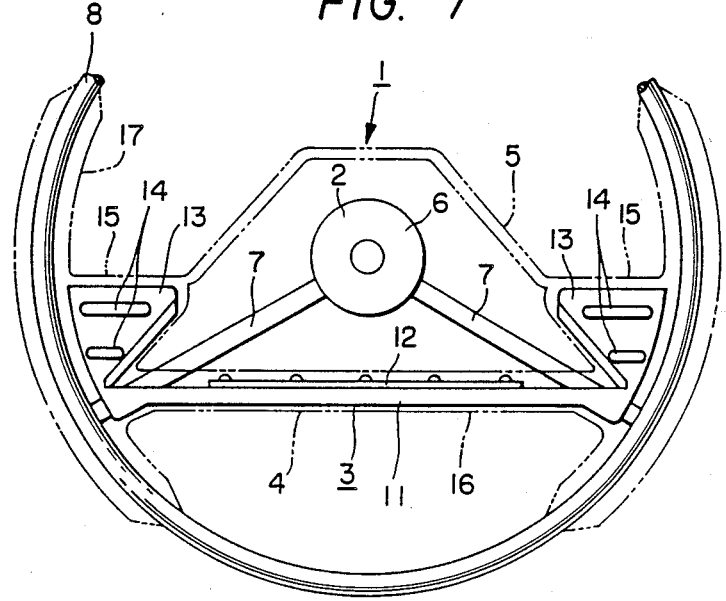
FIG. 7 is a top view of a steering wheel embodying the present invention.
Figure 8:
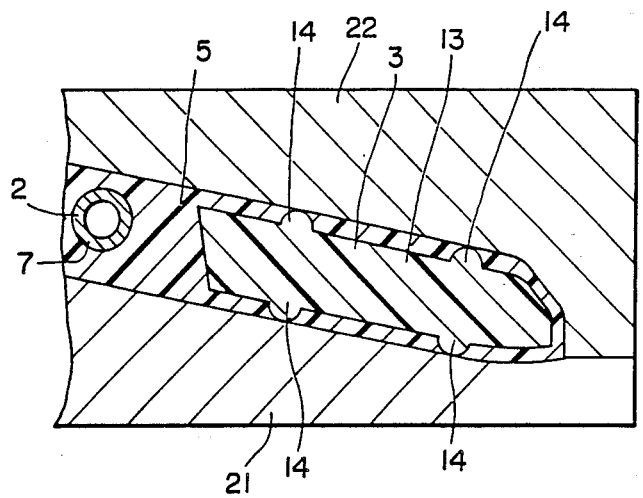
FIG. 8 is a sectional view of the principal part of the spoke while it is formed by injection molding.
Figure 9:
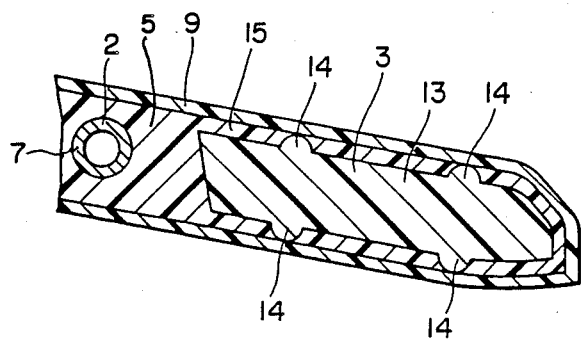
FIG. 9 is a sectional view of the principal part of the finished spoke.

A steering whole shown 1 in FIGS. 7 through 9 comprises a core metal 2, resinous inserts 3 arranged in the rear of the core metal 2, a covering material 4 injection-molded around the core metal 2 and the resinous inserts 3, a lower covering portion 5 injectioned molded together with the covering material 4, an outer covering material 9 injection molded around the lower covering portion 5 and the inner covering material 4, and a pad (not shown) attached to the upper side of the lower covering portion 5.

The aforesaid core metal 2 is fixed to a steering shaft (not shown) with a circular boss 6 fixed with nuts, the boss 6 being fixed to the base thereof, two pipe-like spoke core metals 7 extending in the form of an unfolded fan, and a ring core metal 8 fixed at both front ends of spoke core metal 7, the all aforesaid parts being made of steel.

The aforesaid resinous insert 3 is transversely extended and both the ends are coupled to the transverse insert 11 mounted on the front ends of both spoke core metal 7, to the cover insert 12 extended forward form the center of the transverse insert and continuously upward from both the ends of the transverse insert 11 up to both the spoke core metals 7. The resinous insert 3 is also composed of the two inverted triangles spoke inserts arranged at the corner of the spoke core metal 7 and the ring core metals 8 and integrally composed of injection-molded waste synthetic resin such as the PP.

There are provided transversely extended protrusions 14 semicircular in cross section on the front and rear faces and upper and lower portions on both spoke inserts 13. Further, the protrusions 14 are so arranged as to be in contact with or located close to the face of the injection mold as described later.

The covering material 4 is composed of a spoke cover 15 around the spoke core metals 7 and the spoke insert 13, a cover 16 around the transverse insert 11 and the cove inserts 12 and a ring cover 17 only around the left and right portions of the ring core metal 8 and molded together with glass-fiber reinforced PP by injection molding.

Desired thickness is secured in every portion of the covering material 4 so that surfaces other than those of the core metal 2 and the resinous inserts 3 are prevented from being exposed. In particular as shown in FIG. 9, the thickness equivalent to the height of the protrusion 14 fitted to the spoke insert 13 is at least secured and the resinous insert 3 is integrally fixed to the core metal 2 in position.

Moreover, the lower cover 5 is extended from the periphery of the boss 6 to the spoke cover 15 and the cover 16 and molded integrally with the inner cover 4 and the glass reinforced PP by injection molding.

An outer cover material 9 is, as shown in FIG. 9, extended over the lower cover 5, the spoke cover 15, the ring core metal 8 and the ring cover 17, and integrally molded with flexible PVC (polyvinyl chloride) by injection molding.

Subsequently, the method of manufacturing the steering wheel thus constructed will be described.

As shown in FIG. 8, the core metal 2 is set in the lower die 21 of the injection mold and the resinous insert 3 is mounted on the spoke core metal 7 of the core metal 2. Subsequently, the lower die 21 is lifted to mate the lower die 21 with the upper die 22. At this time, the protrusions 14 provided on the front and rear faces of the spoke insert 13 are caused to contact or located close to the faces of both the dies 21, 22, whereby the whole resinous insert 3 is properly positioned relative to both the dies 21, 22.

When the glass reinforced PP is injected into the cavities of both the dies 21, 22, the PP is made to cover the surfaces of the core metal 2 and the resinous insert 3 to form the inner cover 4 and the lower cover 5. As shown in FIG. 2, since a space equivalent to the height of the protrusion 14 is at least secured between the surface of the spoke insert 13 and the faces of both the dies 21, 22, the glass reinforced PP is forced to fill the space. Accordingly the spoke cover 15 is formed as thick as at least the height of the protrusion 14.

Subsequently, both the dies 21, 22 are opened to take out the core metal 2, etc. and the core metal 2, etc. are set in a conventional transverse injection molding machine to insert and have flexible PVC injection molded. The outer covering material 9 shown in FIG. 9 is formed and then the steering wheel 1 is completed by attaching pads to the spoke core metal 7 and the lower cover 5.

As set forth above, the resinous inserts can be arranged properly within the steering wheel 1 and furthermore the desired thickness of the spoke cover 15 is secured, so that various failures including unpleasant touches, ill-shapes, defects attributed to the exposure of spoke inserts 13 and so on can be prevented.

The present invention is not limited to the aforesaid embodiment but can be modified without departing from the spirit and the scope thereof as hereinafter described in concrete terms. (1) Each positioning protrusion may be what contacts or is located close to the faces of injection molding dies 21, 22 and, when a plurality of them are installed, they need not always contact the dies but can be located close thereto. (2) As the positioning protrusion, any one of those triangular, semicircular, conical and other types in cross section can be employed and the number of them is also not limited. However, the smaller the front end area of the positioning protrusion, the better in that the injected resin may readily be diffused. (3) The dimensions of each resinous insert is variable according to those of the steering wheel. Moreover, the positioning protrusions may be located in any positions on the surface of the resinous insert 3. (4) The positioning protrusion may be molded separately from the resinous insert 3 and coupled thereto afterward. However, both of them may be molded by injection molding less expensively.

As set forth above, it is possible not only to arrange resinous inserts in proper positions of a steering wheel but also secure a desired thickness of covering material, so that failures such as reduction in feeling touch, defectives in terms of shapes and so on can be prevented effectively.

What is claimed is:

1. A steering wheel intermediate product including a part on which a thick covering material is molded, comprising:
    a core metal;
    at least one resinous insert, each said insert having positioning protrusions defined on both top and bottom surfaces thereof; and
    first means for covering said core metal and said at least one resinous insert which is injection molded into a die containing said core metal and said at least one resinous insert so as to define therewith the steering wheel intermediate product, a position of the at least one resinous insert which is spaced apart and separated from the core metal being defined in the die while the protrusions of the resinous insert contact the die, the height of said positioning protrusions being substantially equal to or less than a thickness of said first covering means.

2. The steering wheel intermediate product of claim 1, wherein said first means for covering comprises injected molded glass-fiber reinforced polypropylene.

3. A steering wheel comprising, in combination, the steering wheel intermediate product of claim 1, and further comprising second covering means injection molded in surrounding relation to said first means for covering.

4. A steering wheel as claimed in claim 3, wherein said second covering means comprises flexible polyvinyl chloride injection molded in surrounding relation to said first covering means.

5. The steering wheel intermediate product of claim 1, wherein said positioning protrusions of each said resinous insert are defined integrally therewith and each said positioning protrusion is in the form of a projection having a semicircular cross-section.

* * * * *